(12) United States Patent
Turner

(10) Patent No.: US 7,305,047 B1
(45) Date of Patent: Dec. 4, 2007

(54) AUTOMATIC LANE ASSIGNMENT FOR A RECEIVER

(75) Inventor: Edward James Turner, Bath (GB)

(73) Assignee: Lattice Semiconductor Corporation, Hillsboro, OR (US)

( * ) Notice: Subject to any disclaimer, the term of this patent is extended or adjusted under 35 U.S.C. 154(b) by 847 days.

(21) Appl. No.: 10/387,814

(22) Filed: Mar. 12, 2003

(51) Int. Cl.
*H03K 9/00* (2006.01)
*H04L 27/00* (2006.01)

(52) U.S. Cl. .................. 375/316; 714/100; 710/100; 702/122; 370/230

(58) Field of Classification Search ............... 375/316; 714/100; 370/230, 503; 710/100; 702/122
See application file for complete search history.

(56) References Cited

U.S. PATENT DOCUMENTS

| | | | | |
|---|---|---|---|---|
| 6,718,491 B1 * | 4/2004 | Walker et al. | ............... | 714/701 |
| 6,961,347 B1 * | 11/2005 | Bunton et al. | ............... | 370/465 |
| 7,012,935 B2 * | 3/2006 | Woelk et al. | ............... | 370/503 |
| 2003/0099260 A1 * | 5/2003 | Bunton | ............... | 370/535 |
| 2004/0030968 A1 * | 2/2004 | Fan et al. | ............... | 714/704 |

OTHER PUBLICATIONS

Draft Supplement to IEEE Std. 802.3, 46. Reconciliation Sublayer (RS) and 10 Gigabit Media Independent Interface (XGMII), *IEEE Draft P802.3ae/D5.0*, Copyright © 2002 IEEE.
InfiniBand™ Architecture Release 1.0, "Chapter 5: Link/Phy Interface". vol. 2, *Physical Specifications*, Oct. 24, 2000.
"Physical Layer Specification", *PCI Express Base Specification, Rev.* 1.0.
"Fibre Channel, Rev. 3.4", *INCITS, T11/Project 1413-D/Rev 3.4*, Feb. 5, 2003.

\* cited by examiner

*Primary Examiner*—Curtis Odom

(57) ABSTRACT

A receiver for high-speed serial communication that uses an interface such as XAUI is disclosed with automatic lane assignment. The receiver analyzes incoming data packets and determines the lanes based on the data packets. The lanes are then automatically reordered. The receiver allows the lanes to be connected to the receiver arbitrarily, thereby providing additional layout freedom to circuit board and ASIC designers.

27 Claims, 12 Drawing Sheets

Detail of lane monitor and lane re-order blocks

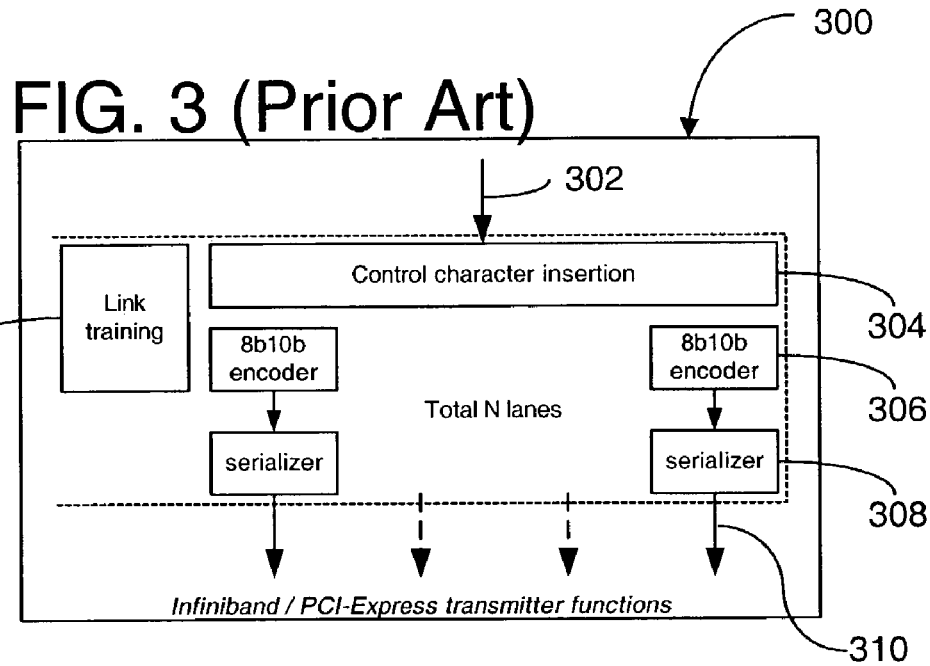
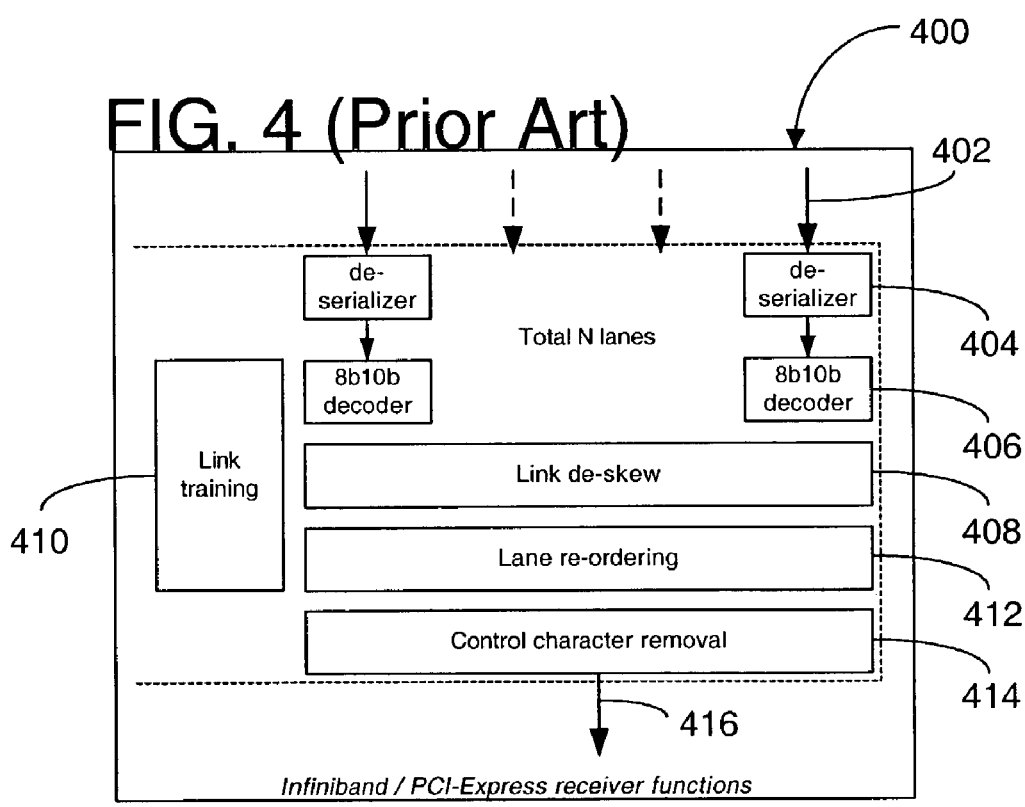

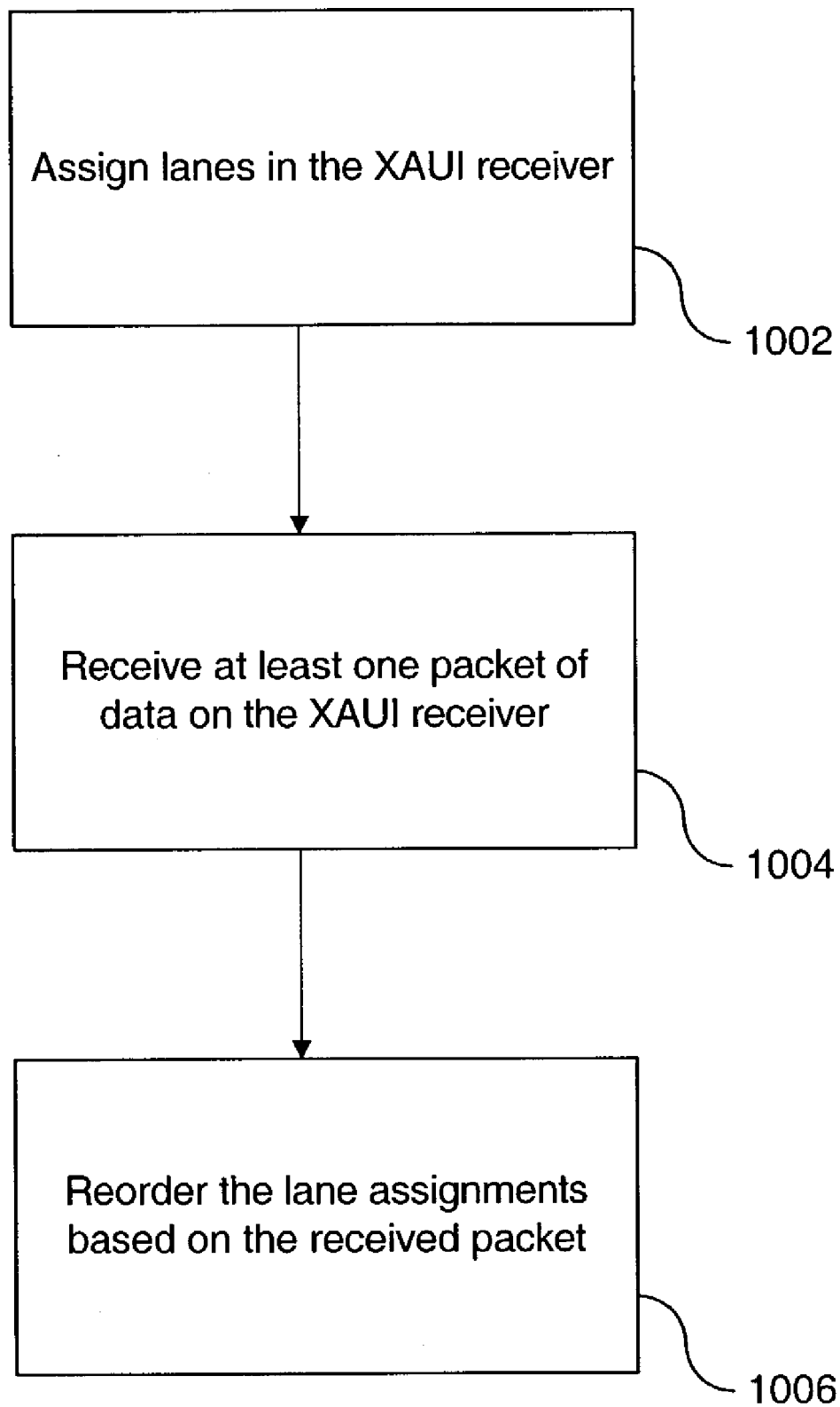

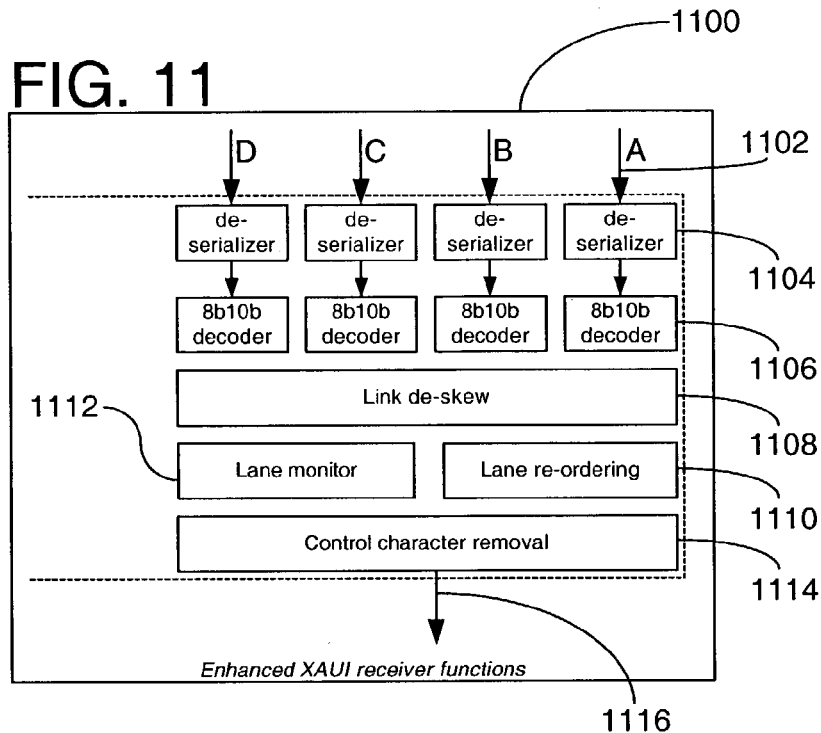
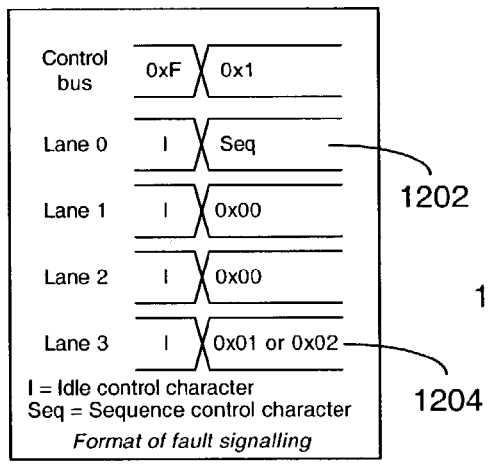
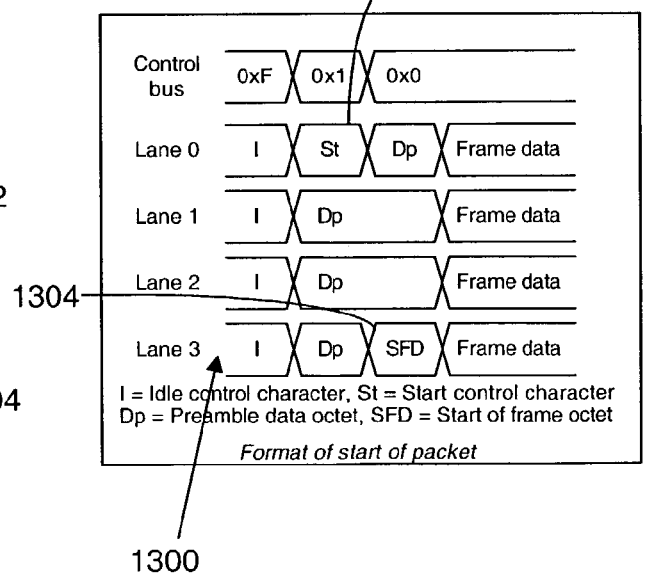

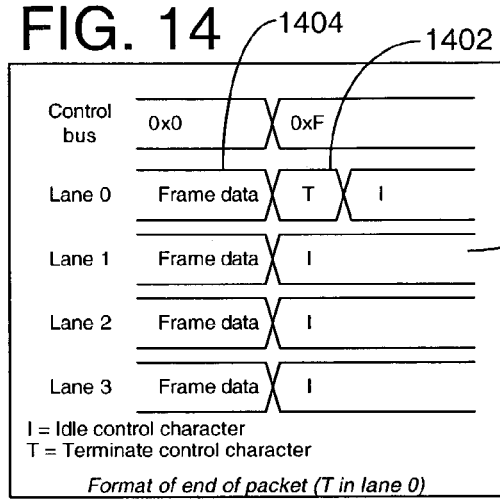
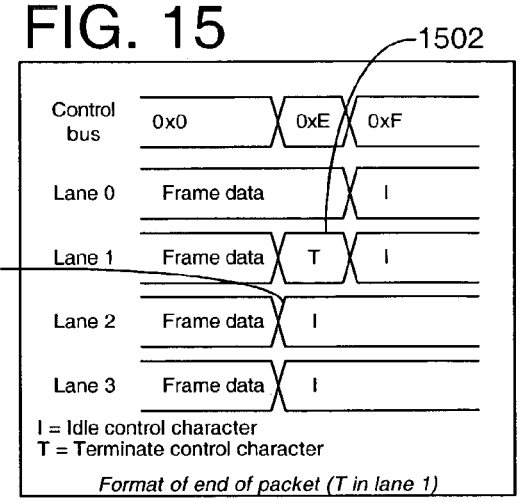
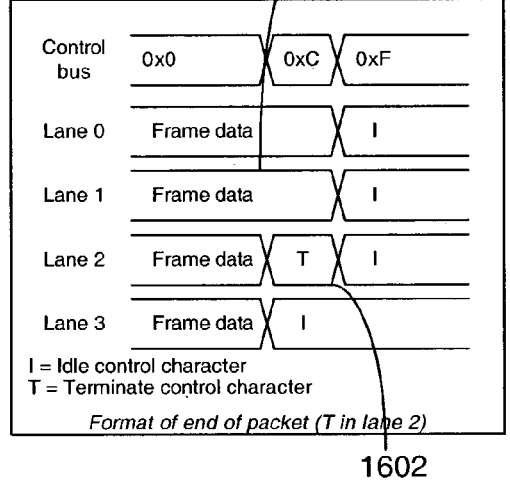
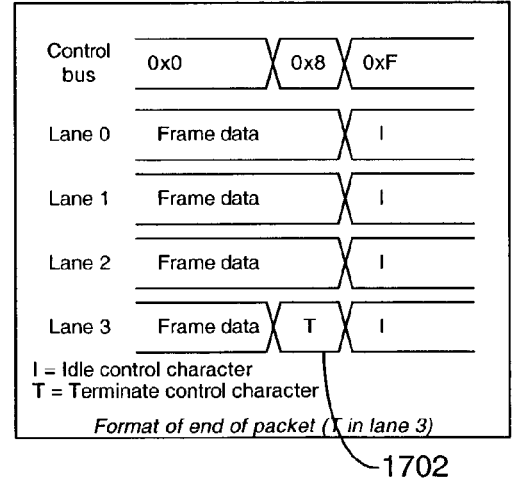
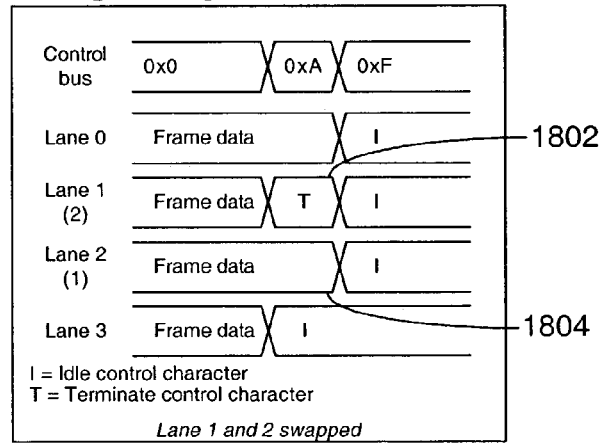
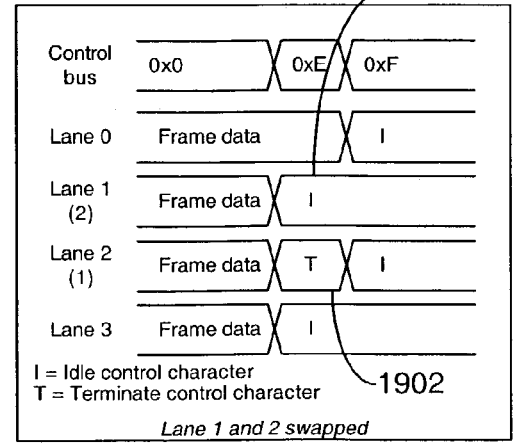

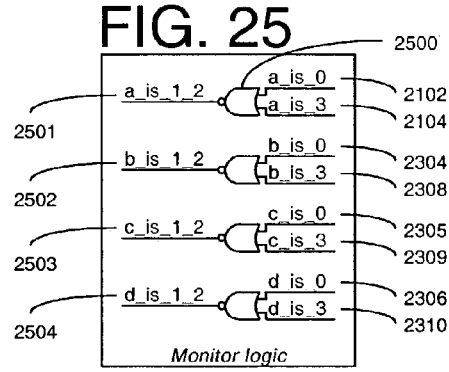
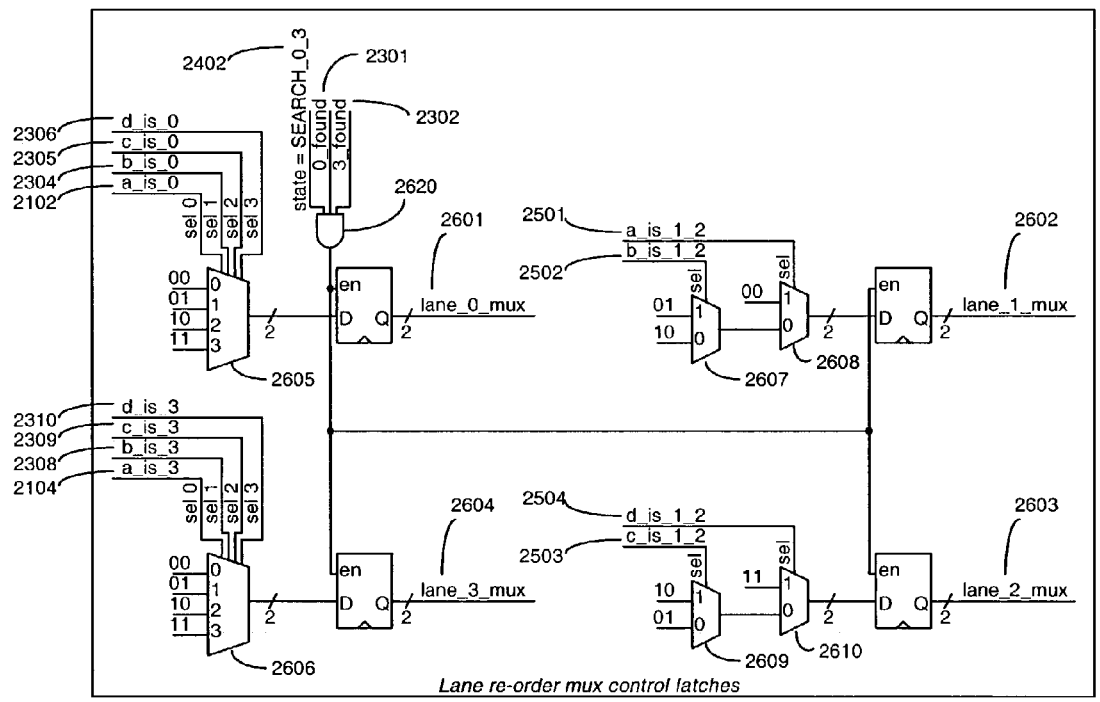

Good and bad CRC counters

Lane 1 and Lane 2 Swap Control Logic

AUTOMATIC LANE ASSIGNMENT FOR A RECEIVER

TECHNICAL FIELD

The invention relates to high-speed communication, and more particularly to high-speed communication in a receiver such as a XAUI receiver.

BACKGROUND

Several standards have emerged for a high-speed serial communication including PCI-Express, Infiniband and XAUI. The XAUI interface is defined by IEEE standard 802.3ae for chip-to-chip or computer-to-computer communication using a 10 Gigabit Ethernet connection. XAUI allows for a low-pin-count electrical interface called a "data link" that includes four differential channels or "lanes" that couple a transmitter on one chip or computer to a receiver on another chip or computer. FIG. 1 shows an example data link 102 coupling together two computers 104, 106 that allows for high-speed communication between the computers using a XAUI interface. FIG. 2 shows an example of a printed circuit board 200 with ASICs 202, 204, each of which houses the necessary hardware for a XAUI interface shown generally at 206, 208. A data link 210 connects the XAUI interfaces 206, 208 together to allow serial communication there between.

Both PCI-Express and Infiniband have link training mechanisms wherein the transmitter uniquely identifies each lane and the receiver uses this identification to arrange the lanes in the correct order. The link training is necessary for PCI-Express and Infiniband, because those standards allow for links of various widths. This allows a user to arbitrarily choose how to connect the transmitter lanes to the receiver lanes. As a result, the user can choose an optimum printed circuit board layout without the constraint of having to connect a particular lane of the transmitter to a particular lane of the receiver.

FIG. 3 shows a block diagram of a PCI-Express or Infiniband transmitter 300. Data to be transmitted over a data link is received on input channel 302. Control characters may be inserted into the data, as shown at 304. The data is encoded (306), serialized (308), and then transmitted on output lanes shown generally at 310. Link training block 312 operates when the link is initialized and transmits special codes on each lane that uniquely identify the lane of the transmitter.

FIG. 4 shows a PCI-Express or Infiniband receiver 400. The lanes 310 from the transmitter are received on input lanes 402. The data on the input lines is de-serialized (404), decoded (406) and de-skewed (408). The receiver 400 also includes link training 410 and a lane reorderer 412. The link training block 410 is responsible for determining the identity of each lane by detecting the special codes sent by the transmitter and configuring the lane reorderer 412 to correctly sequence the lanes. Thus, it is not necessary to connect any particular lane of the transmitter to a particular lane of the receiver as the link training protocol that operates at initialization identifies the lanes so the receiver reorders the lanes appropriately. After the lanes are reordered, the control character removal block 414 removes any control characters and the data is output on port 416.

Unfortunately, the XAUI interface for the 10 Gb Ethernet does not have an equivalent training and identification scheme that allows automatic detection and arrangement of lanes within a XAUI link. FIG. 5 shows the XAUI link relative to other layers in an OSI layer model. XAUI is a part of the optional XGMII extender 500 that includes XGXS blocks 502, 504. FIG. 6 shows further structure of the XGXS blocks 502, 504 of FIG. 5. Each XGXS block includes a transmit-and-receive pair that allow for full-duplex communication. For example, a XAUI transmitter 602 within XGXS block 502 is coupled to a XAUI receiver 604 in XGXS block 504. Likewise transmitter 606 in XGXS block 504 is coupled to the XAUI receiver 608 in XGXS block 502.

FIG. 7 shows further detail of the XAUI transmitter 606 and the XAUI receiver 608. The XAUI transmitter takes a 32-bit data bus (D 31:0) and four control lines (C 3:0) and converts them into four separate transmit lanes shown generally at 700. The XAUI receiver takes the four separate transmit lanes 700 and reconstitutes the original 32-bit data bus and four control lines to generate an output shown generally at 702.

FIG. 8 shows a more detailed block diagram of the XAUI transmitter 606. A parallel data bus of 32 bits is received on input port 802 and is converted to four serial lanes operating at 3.125 Gbps shown generally at 804. Each lane has an encoder, shown generally at 806, and a serializer, shown generally at 808, associated therewith. Additionally a control character insertion block 810 is used to insert control characters into the data stream to support various features well understood in the art.

FIG. 9 shows a prior art XAUI receiver 608 in greater detail. The serial output 804 from the transmitter (FIG. 8) is received on input port 902. Each lane is then de-serialized (904), decoded (906), and de-skewed (908). Finally, the control character removal block 910 removes the characters previously inserted by the transmitter and outputs the final data on output port 912.

Notably, the XAUI transmitter and receiver do not have any provision to automatically detect lane numbers. Thus, a designer must ensure that lane 0 of the transmitter is connected correctly to lane 0 of the receiver and likewise for lanes 1, 2 and 3. Thus, there is a need for automatic lane detection in a XAUI interface.

SUMMARY

A receiver is disclosed that examines received data packets to automatically determine the correct lane ordering and assigns the lanes accordingly. Automatic lane assignment allows the designer to route the receiver lanes without worry of fixed lane assignments. Additionally, a transmitter is used that does not need to include link training hardware. Thus, the receiver analyzes the format, characteristics, and timing of standard packet data to determine lane assignments, rather than receiving specific lane assignment information from the transmitter.

The receiver examines incoming data packets for lane identity information and assigns the lanes according to their identities. For example, the receiver may examine the beginning of a data packet for lane identity information, such as by identifying a start control character or a sequence control character. The receiver may also examine the end of a data packet for lane identity information. For example, the receiver may identify a terminate control character in combination with either an idle character or a frame data octet to determine the lane identities. The cyclic redundancy check (CRC) may also be used to test whether or not lane assignments are correct.

These and other aspects will become apparent from the following detailed description, which makes references to the accompanying drawings.

BRIEF DESCRIPTION OF THE DRAWINGS

FIG. 3 shows a prior art Infiniband or PCI-Express transmitter.

FIG. 4 shows a prior art Infiniband or PCI-Express receiver.

FIG. 10 is a flow chart of a method for reordering lanes in a XAUI receiver.

FIG. 11 is a block diagram of a XAUI receiver according to the invention.

FIG. 12 shows a timing diagram of a fault sequence that may be used to determine the lane assignments in the XAUI receiver.

FIG. 13 shows a timing diagram of a start of a data packet that may be used to determine lane assignments in the XAUI receiver.

FIG. 14 is a timing diagram of an end of data packet with a terminate control character on lane 0 used to identify lanes in a XAUI receiver.

FIG. 15 shows a timing diagram of an end of data packet with a terminate control character on lane 1.

FIG. 16 shows a timing diagram of an end of data packet with a terminate control character on lane 2.

FIG. 17 shows a timing diagram of an end of data packet with a terminate control character on lane 3.

FIG. 18 shows a timing diagram of an end of data packet with lanes 1 and 2 swapped and a terminate control character on lane 1.

FIG. 19 shows a timing diagram of an end of data packet with lanes 1 and 2 swapped and a terminate control character on lane 2.

FIG. 25 is a hardware diagram of monitor logic for identifying lanes 1 and 2.

FIG. 26 is a hardware diagram showing further details of the lane reordering logic.

DETAILED DESCRIPTION

In accordance with an embodiment of the invention, an enhanced XAUI receiver is described that automatically assigns lanes of the XAUI link based on lane information contained in received data packets. A circuit designer using the enhanced XAUI receiver has extra design flexibility to connect the lanes in the receiver in any desired order. The automatic lane assignment and reordering of the enhanced XAUI receiver is transparent to the XAUI transmitter.

FIG. 10 is a flow chart of a method for automatic lane assignment in a XAUI receiver. In process block 1002, the XAUI receiver assigns the lanes in a predetermined order. For purposes of discussion, it is assumed that the lanes prior to reordering are lanes A-D and that the properly identified lanes after being reordered are lanes 0-3. The XAUI receiver must assume a lane ordering as a starting point. For example, the XAUI receiver may assume that lane A is lane 0, lane B is lane 1, etc. In process block 1004, the XAUI receiver receives at least one packet of data. Even though no special link training is added to the XAUI transmitter, the packet of data has various aspects that allow a determination to be made on lane ordering, as further discussed below. In process block 1006, lanes A-D are assigned to the XAUI receiver lanes 0-3 in the proper order. The lane reordering is based on timing and/or characters received in the packet.

Figure 1:
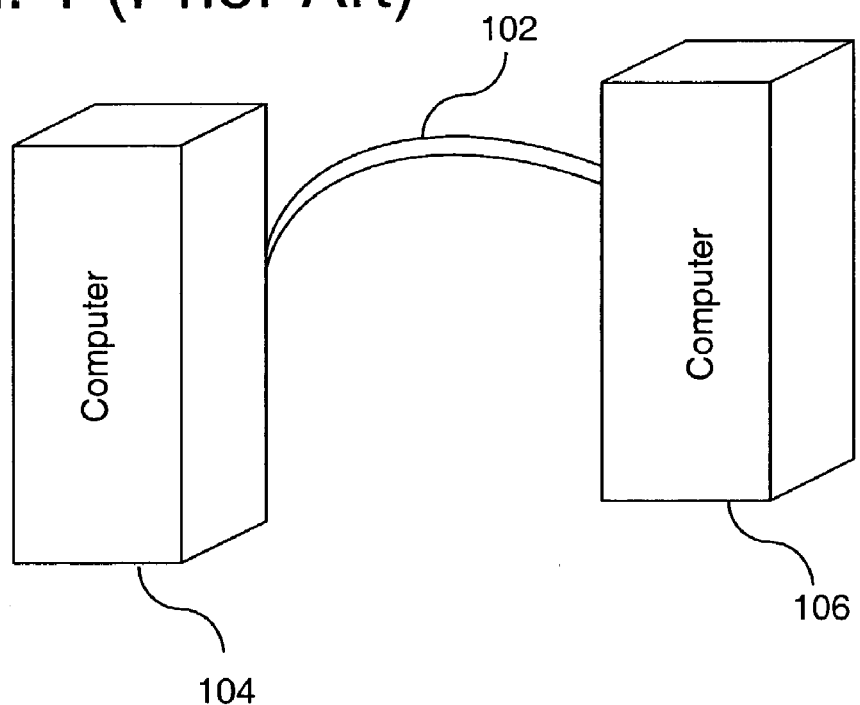
FIG. 1 shows a prior art computer system with a XAUI link coupling the computers together.
Figure 2:
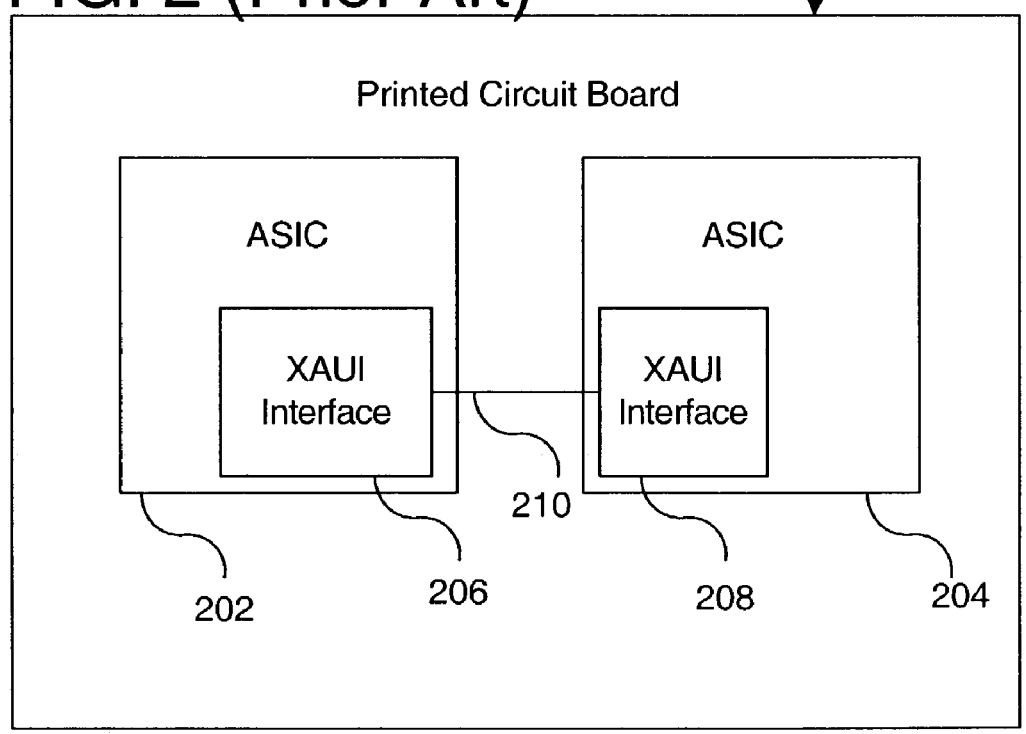
FIG. 2 shows a prior art XAUI link coupling together two integrated circuits on a printed circuit board.
Figure 5:
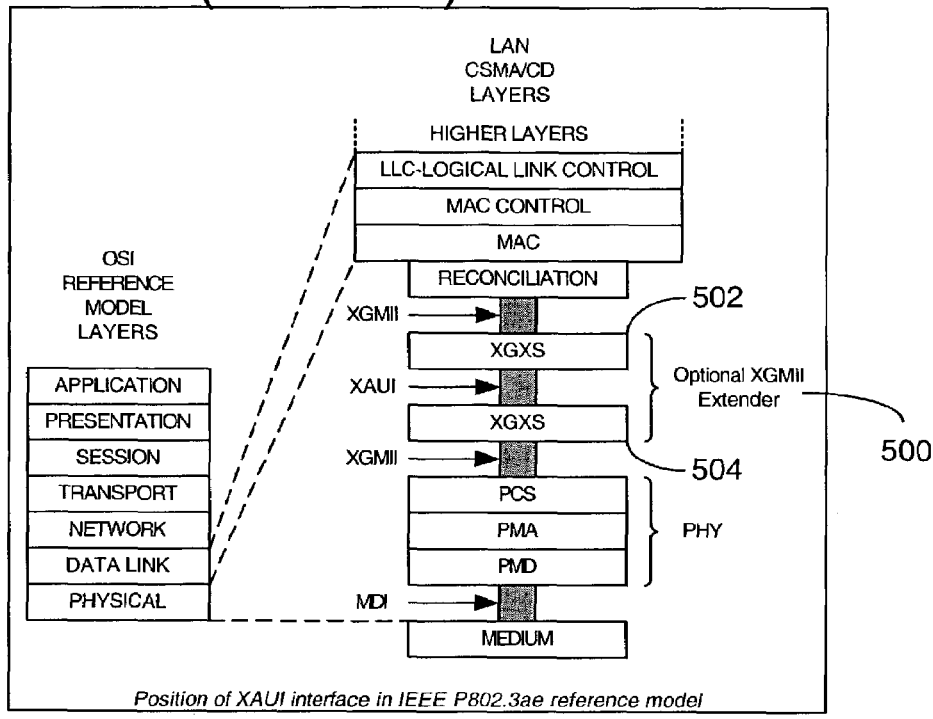
FIG. 5 shows a prior art XAUI link relative to other layers in both the IEEE and ISO reference models.
Figure 6:
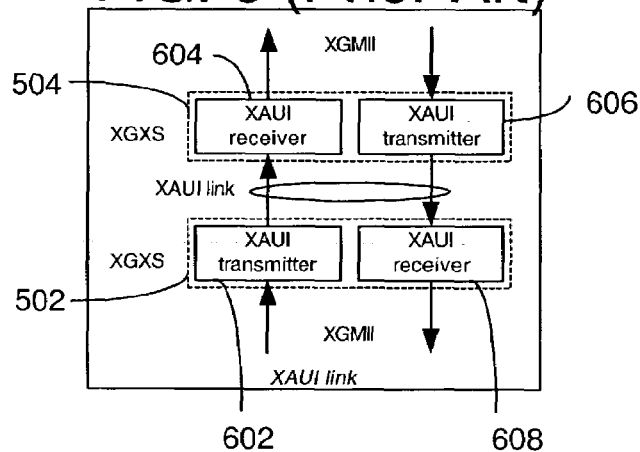
FIG. 6 shows the prior art XAUI link including transmitter and receiver pairs.
Figure 7:
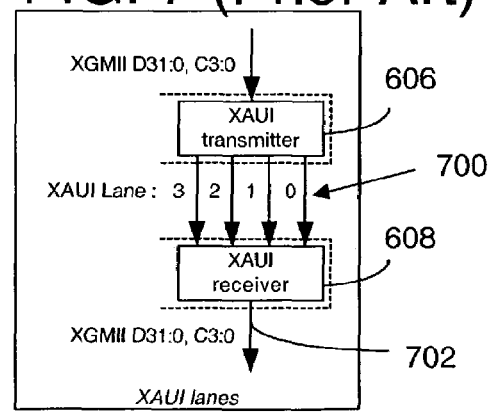
FIG. 7 shows further details a transmitter and receiver pair of FIG. 6.
Figure 8:
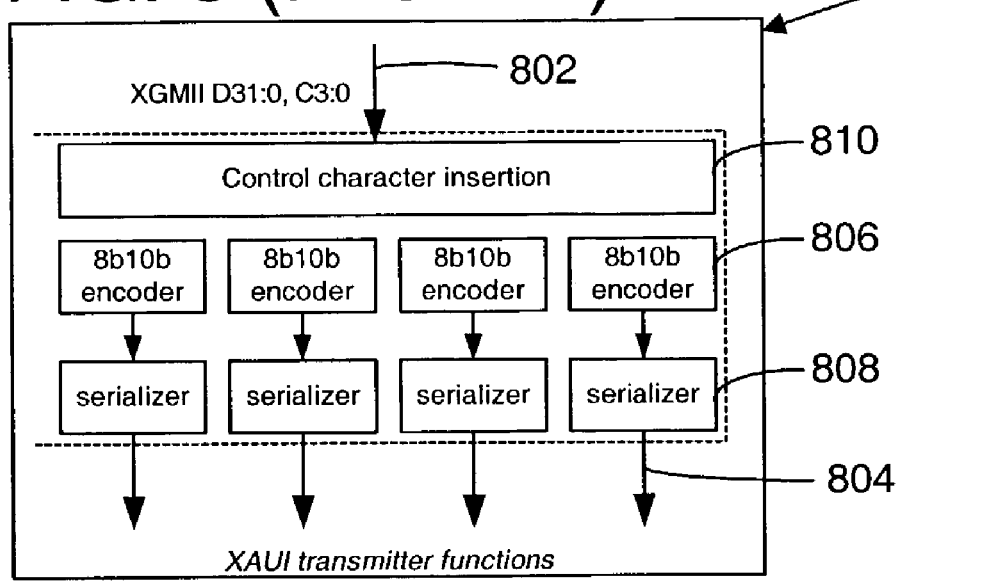
FIG. 8 shows a detailed block diagram of a prior art XAUI transmitter.
Figure 9:
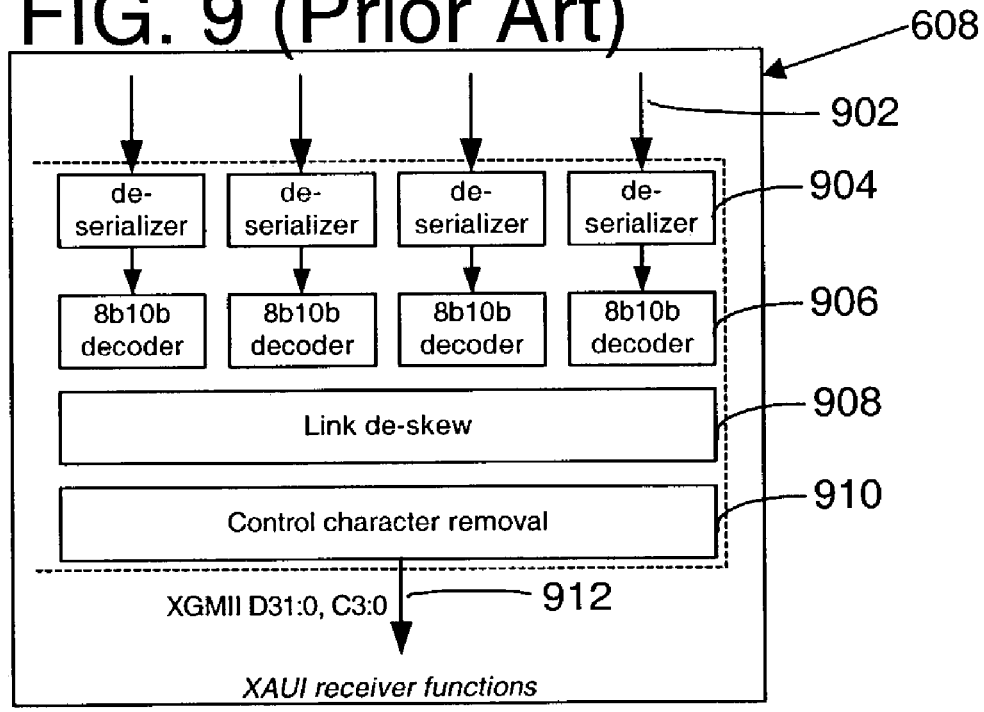
FIG. 9 shows a detailed block diagram of a prior art XAUI receiver.

FIG. 11 shows a XAUI receiver 1100 used for automatic lane reordering. Incoming data is received from a standard XAUI transmitter on input port 1102 as lanes A through D. The data is then de-serialized (1104), decoded (1106), and de-skewed (1108). The de-serializing, decoding and de-skewing is similar to that which occurs in the prior art XAUI receiver (FIG. 9) as already described. The XAUI receiver 1100 also includes a lane reordering block 1110 and a lane monitor 1112. The lane monitor 1112 monitors lanes A through D as packet data is received. Based on the received packet data (which is standard packet data without special lane identification codes), the lane monitor determines the proper lane assignments for lanes A through D and controls the lane reordering block 1110 based on the lane determination. The lane reordering block 1110 reorders the lanes A through D to the appropriate lanes 0 through 3 based on control signals from the lane monitor. The appropriate lanes are then passed to the control character removal block 1114 and data is finally output on port 1116. The control character removal is similar to that which occurs in the prior art XAUI receiver.

FIG. 12 shows a timing diagram of packet data received on the XAUI input port 1102. In particular, FIG. 12 shows the format of fault signaling that may occur in the received packets. When a XAUI link first starts up, the XAUI transmitter sends either idle control characters on all four lanes or fault sequence ordered sets. During a fault sequence, a sequence control character 1202 appears on lane 0 at the same time that a 0x1 or 0x2 character 1204 appears on lane 3. Thus, the lane monitor 1112 identifies lanes 0 and 3 by observing this fault sequence received on the input port 1102.

FIG. 13 shows an example of a timing diagram for identifying lanes of the XAUI receiver based on idle control characters instead of fault sequence characters. As shown at 1300, idle control characters are received on each lane of the receiver 1100. After the idle control character, a start control character 1302 is received on lane 0. Then in a succeeding frame data octet, a start-of-frame octet appears (1304) on lane 3. Once the lane monitor identifies lane 0 and 3, the assignment of lanes 1 and 2 is initially made arbitrarily and checked at the end of the first received packet. Depending on the length of the packet, the "terminate" control character may fall in one of four possible positions in the received packet.

FIGS. 14 through 17 show variations of the terminate control character appearing on lanes 0 through 3, respectively, at the end of a data packet. Note that frame data octets are received before the terminate control character is received and idle control characters are received after the terminate control character is received. For example, FIG. 14 shows a terminate control character 1402 received after frame data 1404 but before an idle control character 1406.

FIG. 15 shows a terminate control character 1502 on lane 1 at the same time that an idle control character 1504 appears on lane 2. Such a sequence is used to identify lanes 1 and 2.

FIG. 16 shows a terminate control character 1602 on lane 2 at the same time that that a frame data octet 1604 appears on lane 1. Such a sequence is used to identify lanes 1 and 2.

FIG. 17 shows an example of a terminate character 1702 received on lane 3. FIG. 14 is an example of the terminate character 1402 received on lane 0. For cases where the terminate control of the first received packet is on lane 0 or 3 (as in FIGS. 14 and 17), a cyclic redundancy check (CRC) of the packet is performed by the MAC layer and the result of this is used to check the ordering of lanes 1 and 2. If the calculated CRC fails to match the transmitted CRC, then lanes 1 and 2 are swapped. Some form of hysteresis is required to prevent a bit error on the link from inducing a lane swap of lanes 1 and 2 where none is required.

FIGS. 18 and 19 show examples of situations where lanes 1 and 2 are swapped. In FIG. 18 a terminate control character 1802 appears on lane 1 at the same time that a frame data octet 1804 appears on lane 2. In such a situation the lane monitor recognizes that lanes 1 and 2 are swapped and must be reordered. Similarly FIG. 19 shows the terminate character 1902 on lane 2 at the same time that the idle control character 1904 appears on lane 1. In such a situation the lane monitor recognizes that lanes 1 and 2 are swapped and reorders the lanes accordingly.

Figure 20:
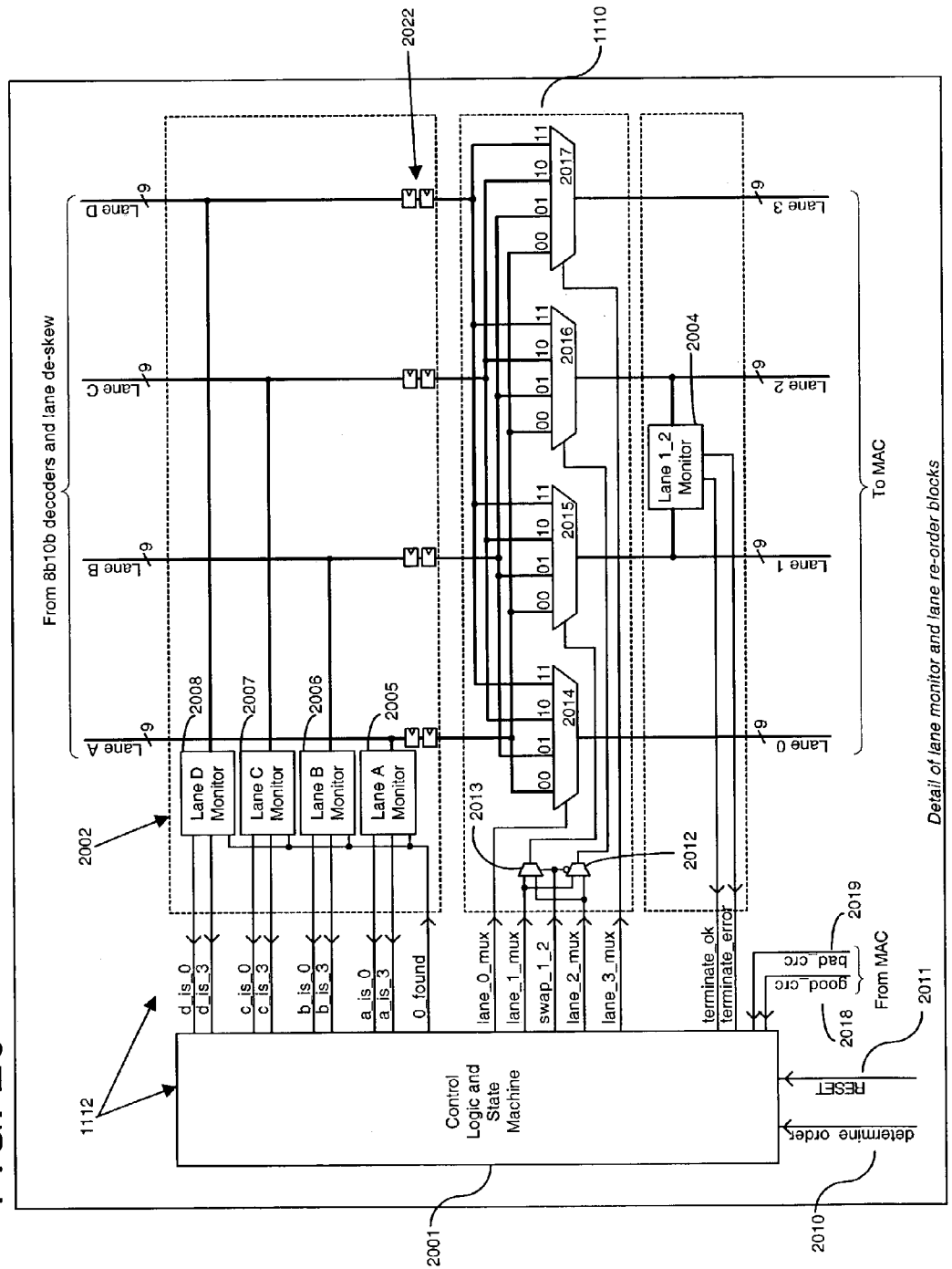
FIG. 20 shows a detailed hardware diagram of the lane monitor and lane reordering logic.

FIG. 20 shows further detail of the lane monitor 1112 and lane reordering block 1110 (FIG. 11). The lane monitor 1112 includes control-logic-and-state-machine block 2001, individual lane monitors 2002, which monitor the lanes prior to reordering, and a lane 1_2 monitor 2004, which monitors the lanes after reordering. As described further below, the control logic and state machine 2001 receives inputs from the lane monitors 2002, 2004 and, based on those inputs, controls the lane reorderer 1110 to switch the set of lanes A-D to the set of lanes 0-3 and thereby assign lanes 0-3 to lanes A-D. The lane monitors 2002 include lane A monitor 2005, lane B monitor 2006, lane C monitor 2007, and lane D monitor 2008. Each of these logic blocks monitor their respective lane for special characters within the data packets. The lane 1_2 monitor 2004 has two outputs called "terminate_ok" and "terminate_error". Terminate_ok is asserted if a terminate character appears on lane 1 at the same time as an idle character appears on lane 2 (see FIG. 15) or if a terminate character appears on lane 2 with a frame data octet on lane 1 (see FIG. 16). Terminate_error is asserted if a terminate control character is received on lane 1 at the same time frame data is received on lane 2 (see FIG. 18) or if a terminate character is received on lane 2 at the same time as an idle control character is received on lane 1 (see FIG. 19). The lane re-orderer 1110 includes four 4-to-1 multiplexers 2014, 2015, 2016, and 2017. These multiplexers are coupled to each of the lanes A through D and can switch the lanes to any of the lanes 0 through 3. The control lines of these multiplexers are coupled to the control logic and state machine 2001 and to multiplexers 2012 and 2013.

Each lane has two latches 2022 just after the lane monitors 2002 and just before the 4-to-1 multiplexers 2014, 2015, 2016, and 2017. Each of the latches 2022 is a register that is 9 bits wide. The purpose of the latches 2022 is to delay the data by two clock cycles, while the logic determines if there needs to be a lane reorder, so that there is time to perform a lane reorder before the date passes through the 4-to-1 multiplexers 2014, 2015, 2016, and 2017.

Figure 21:
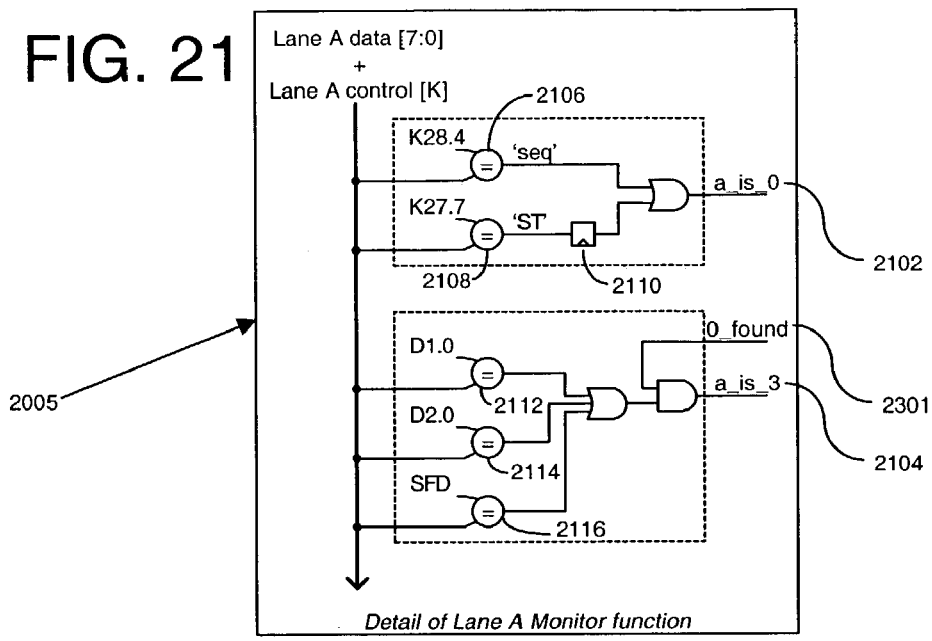
FIG. 21 is a hardware diagram showing further detail of a lane monitor of FIG. 20.

FIG. 21 provides further detail of the logic within lane A monitor 2005. The other lane monitors 2002 have a similar design. The lane monitor 2005 has two outputs shown at 2102 and 2104 called "a_is_0" and "a_is_3", respectively. Output 2102 is activated if it is determined that lane A is lane 0, whereas output 2104 is activated if lane A is lane 3. A comparator shown at 2106 compares whether the packet information on lane A is equivalent to a sequence control character and, if so, output 2102 is activated. Comparator 2108 compares whether the packet data on lane A is equivalent to a start control character and, if so, output 2102 is activated, but only after being delayed by register 2110, which delays the output by one frame data octet. Comparators 2112, 2114 and 2116 check whether the packet data on lane A is a 0x1 character, a 0x2 character, or a start-of-frame data, respectively. If any one of these conditions is met, then output 2104 is activated indicating that lane A is lane 3, if lane 0 is found to be one of the other lanes, as indicated by the input 0_found 2301.

Figure 22:
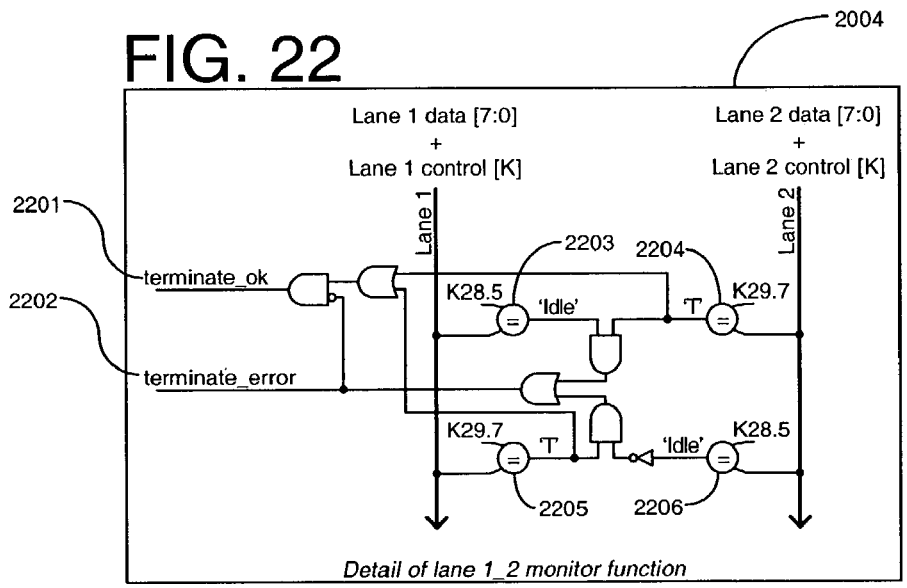
FIG. 22 is a hardware diagram showing details of a lane monitor of FIG. 20 coupled to lanes 1 and 2.

FIG. 22 shows a detailed circuit diagram of the lane 1_2 monitor 2004. As previously discussed, monitor 2004 includes two output signals "terminate_ok" 2201 and "terminate_error" 2202. Output 2201 is activated when lanes 1 and 2 are properly designated. Conversely, output 2202 is activated when lanes 1 and 2 require swapping. Comparators 2203 and 2204 detect whether idle and terminate control characters appear on lanes 1 and 2, respectively. Comparators 2205 and 2206 are used to check for the terminate control character on lane 1 and the idle character on lane 2.

Figure 23:
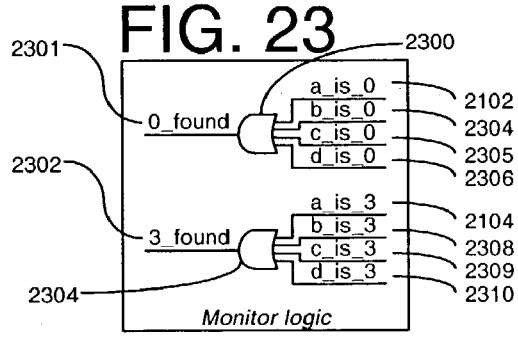
FIG. 23 is a hardware diagram showing the monitor logic for identification of lanes 0 and 3.

FIG. 23 shows additional logic found in the control logic and state machine 2001 (FIG. 20). OR gates 2300 and 2304 combine together the outputs from each of the lane monitors 2002. Specifically each output associated with identification of lane 0 is fed into OR gate 2300 and each output associated with lane 3 is fed into OR gate 2304. The outputs from OR gates 2300 and 2304 are "0_found" 2301 and "3_found" 2302. The inputs b_is_0, c_is_0, and d_is_0 are labeled 2304-2306, respectively, for reference in later drawings. Likewise, inputs b_is_3, c_is_3, and d_is_3 are labeled 2308-2310.

Figure 24:
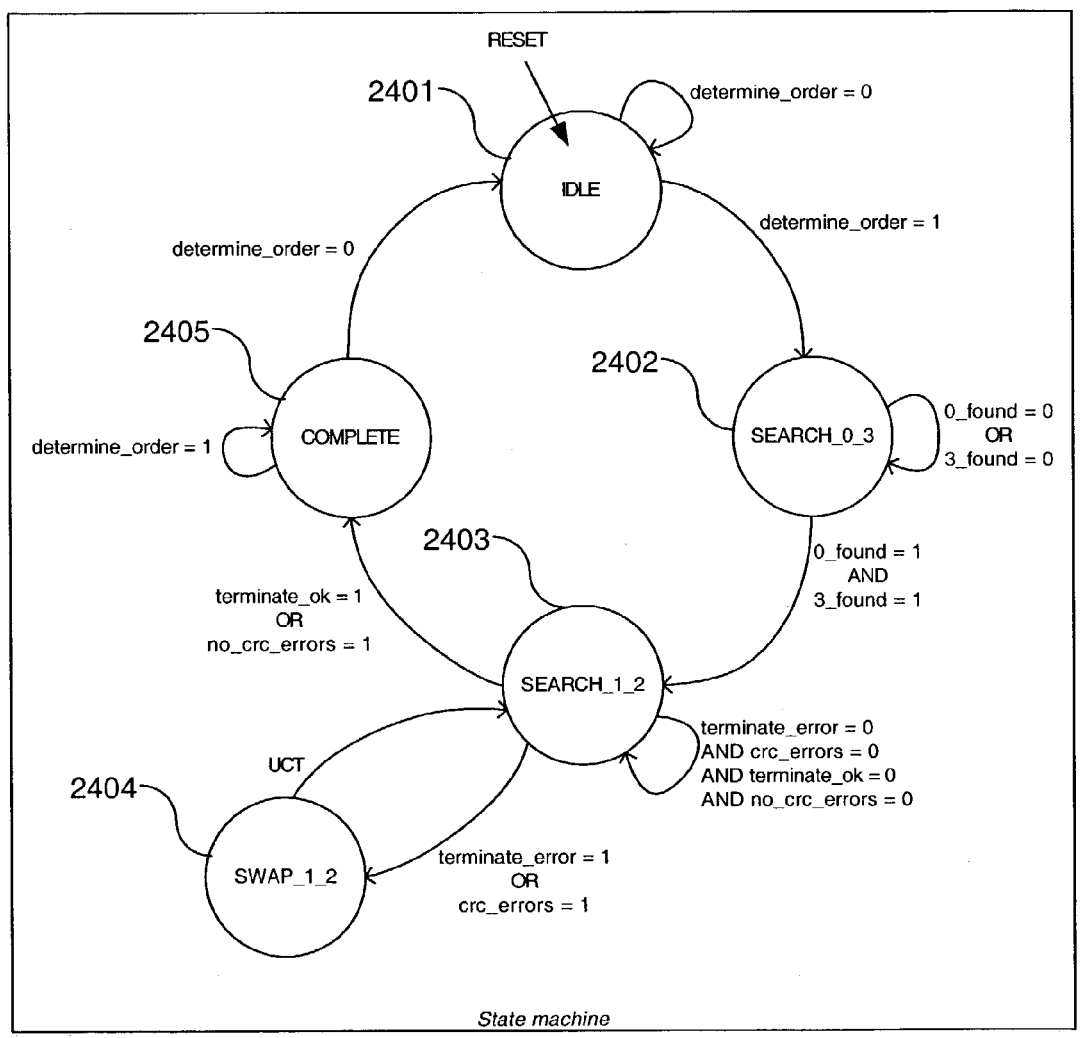
FIG. 24 shows a state machine diagram for the lane reorderer controller in the XAUI receiver.

FIG. 24 shows a state machine implemented by the control logic and state machine 2001 (FIG. 20). On reset 2011, the state machine enters the IDLE state 2401, where it remains until a higher layer function asserts "determine_order" shown in FIG. 20 at 2010. The determine_order signal is activated to request that lanes A-D be identified as lanes 0-3. When determine_order 2010 is activated, the state machine enters the search_0_3 state 2402. In this state, lanes A-D are analyzed to identify which of these lanes are lanes 0 and 3. To accomplish this identification, the control logic and state machine 2001 analyzes the outputs 2301 and 2302 (see FIG. 23) and enters state 2403 if both outputs are activated. Otherwise the state machine 2001 stays in state 2402 waiting for identification of lanes 0 and 3. Once the state machine enters state 2403, lanes 0 and 3 have been properly identified and reordered and the state machine attempts to then identify lanes 1 and 2. If terminate_error 2202 (see FIG. 22) or crc_errors 2701 (described below) is activated, the state machine switches to state 2404 where lanes 1 and 2 are swapped and then the state machine switches back to state 2403. When terminate_ok 2201 (see FIG. 22) or no_crc_errors 2702 (described below) is activated, the state machine switches to the complete state 2405. The state machine remains in the complete state 2405 as long as determine_order 2010 is asserted or until reset 2011 is asserted.

FIG. 25 shows logic contained in the control logic and state machine 2001. This logic determines which lanes are lanes 1 and 2. The logic includes a NOR gate 2500 that includes input signals 2102 and 2104 (see FIG. 21) from the lane monitors 2002. Signal 2102 is activated if lane A is lane 0 and signal 2104 is activated if lane A is lane 3. If either of the inputs is activated, then output 2501 is deactivated indicating lane A is not lane 1 or 2. If neither of these signals is activated, then the NOR gate 2500 outputs a signal on output 2501 indicating that A must be lane 1 or 2 because it is not lane 0 or 3. Similar logic is repeated for lanes B through D to generate outputs 2502-2504.

FIG. 26 shows the lane reordering control logic within 2001 that takes control signals from the control logic and state machine and generates control signals for controlling the reorderer 1110. Lane reordering is enabled only when the state machine is in the SEARCH_0_3 state 2402 and both 0_found 2102 and 3_found 2104 are asserted. Lines a_is_0, b_is_0, c_is_0, and d_is_0 (see FIG. 23) are control inputs into a 4-to-1 two-bit multiplexer 2605. Depending on which of lanes A-D is lane 0, the two bits 00, 01, 10, or 11 representing lanes A-D, respectively, are asserted on lane_0_mux 2601. An AND gate 2620 ensures that the lane_0_mux signal 2601 is asserted only when the signals 0_found, 3 found (FIG. 23), and the state is 2402 (FIG. 24) are activated. Similar logic shown at 2606 generates the lane_3_mux signal 2604.

Two 2-to-1 multiplexers 2607, 2608 are used to control signal lane_1_mux 2602. If a_is_1_2 2501 (FIG. 25) is asserted, then the bits 00 representing lane A are asserted on lane_1_mux. Otherwise, if b_is_1_2 2502 is asserted, then the bits 01 representing lane B are asserted on lane_1_mux. If neither a_is_1_2 nor b_is_1_2 is asserted, then the bits 10 representing lane C are asserted on lane_1_mux.

Similarly, two 2-to-1 multiplexers 2609, 2610 are used to control lane_2_mux 2603. If d_is_1_2 2504 is asserted, then the bits 11 representing lane D are asserted on lane_2_mux. Otherwise, if c_is_1_2 2503 is asserted, then the bits 10 representing lane C are asserted on lane_2_mux. If neither d_is_1_2 nor c_is_1_2 is asserted, then the bits 01 representing lane B are asserted on lane_2_mux.

Lane_0_mux 2601 and lane_3_mux 2604 control the 4-to-1 multiplexers 2014, 2017 which are part of the lane reorderer 1110. Lane_1_mux 2602 and lane_2_mux 2603 indirectly control the 4-to-1 multiplexers 2015, 2016 which are part of the lane reorderer via the two 2-to-1 multiplexers 2012, 2013. If swap_1_2 is asserted, then the two multiplexers 2012, 2013 swap lane_1_mux and lane_2_mux before the lines reach the 4-to-1 multiplexers 2015, 2016.

The latches 2022 delay the data by two clock cycles as discussed above. This is done because there can be a clock cycle of delay through the lane monitors 2002 (due to register 2110) and there is another clock cycle of delay due to the registers that drive lane_0_mux 2601, lane_1_mux 2602, lane_2_mux 2603, and lane_3_mux 2604.

Figure 27:
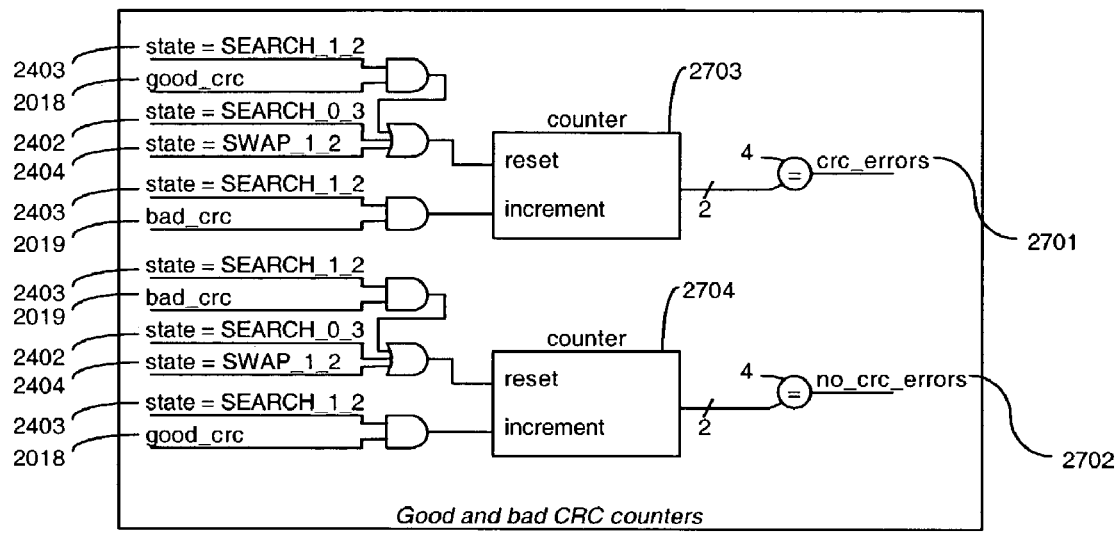
FIG. 27 is a hardware diagram of CRC counter logic.

FIG. 27 shows the CRC counter logic. The good (i.e. valid) and bad (i.e. invalid) CRC counters 2704, 2703 lend a form of hysteresis to the good_crc 2018 and bad_crc 2019 lines. A predetermined number of successive assertions of good_crc 2018 or bad_crc 2019 while in the SEARCH_1_2 state 2403 are required to assert crc_errors 2701 and no_crc_errors 2702 respectively. Hysteresis prevents the receiver from making a premature lane swap based on a false good_crc 2018 or false bad_crc 2019 assertion caused by a single bit error in a given packet. Four is an example of a predetermined number, although any number that properly balances stability verse boot time may be used.

The bad CRC counter 2703 is reset if the state is SWAP_1_2 2404, if the state is SEARCH_0_3 2402, or if the state is SEARCH_1_2 2403 and good_crc 2018 is asserted. Similarly, the good CRC counter 2704 is reset if the state is SWAP_1_2 2404, if the state is SEARCH_0_3 2402, or if the state is SEARCH_1_2 2403 and bad_crc 2019 is asserted.

Figure 28:
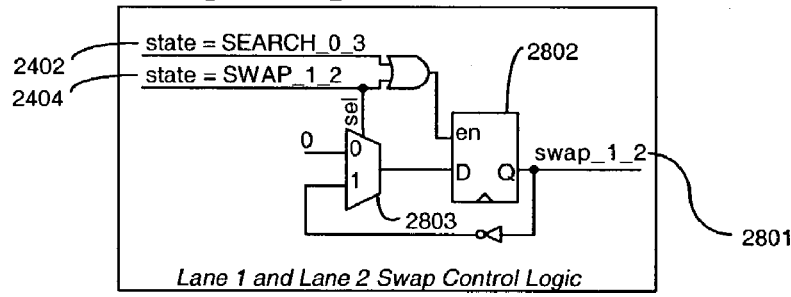
FIG. 28 is a hardware diagram of the lane swapping control logic.

FIG. 28 shows the lane 1 and 2 swapping control logic. The lane swap_1_2, shown at 2801, is an output of the lane 1 and 2 swapping control logic and is an input into the two 2-to-1 multiplexers 2012, 2013 that control lane swapping for lanes 1 and 2. The flip flop 2802 is enabled if the state is SEARCH_0_3 2402 or SWAP_1_2 2404. The 2-to-1 multiplexer 2803 is controlled by whether or not the current state is SWAP_1_2 2404. Swap_1_2 2801 is set to zero when the state machine enters SEARCH_0_3 2402. After that swap_1_2 2801 is inverted every time the state machine enters SWAP_1_2.

Having illustrated and described the principles of the illustrated embodiments, it will be apparent to those skilled in the art that the embodiments can be modified in arrangement and detail without departing from such principles.

For example, the described XAUI receiver may be used to link integrated circuits or may allow the use of a cable with arbitrarily connected lanes to link system components.

While the illustrated embodiments refer to a XAUI receiver, the described enhanced receiver comprises any enhanced receiver that automatically identifies and assigns lanes based on a communication protocol when the protocol itself does not define automatic lane assignment. For example, FibreChannel, also known as 10GFC, implements the XAUI interface for receiving data, and, therefore, does not define automatic lane assignment. The described enhanced receiver includes an enhanced FibreChannel receiver with automatic lane assignment.

In view of the many possible embodiments, it will be recognized that the illustrated embodiments include only examples and should not be taken as a limitation on the scope of the invention. Rather, the invention is defined by the following claims. I therefore claim as the invention all such embodiments that come within the scope of these claims.

I claim:

1. A method of reordering data within a data packet received on a receiver, comprising:
receiving data in a data packet simultaneously on first and second data receiving lanes of the receiver;
determining in which of the first and second lanes a first character type in the data packet is received and in which of the first and second lanes a second character type in the data packet is received;
based on at least that determination, assigning an order to the first and second lanes;
receiving data in the data packet on third and fourth data receiving lanes of the receiver;
determining in which of the third and fourth lanes a third character type in the data packet is received and in which of the third and fourth lanes a fourth character type in the data packet is received; and based on at least that determination, assigning an order to the third and fourth lanes.

2. The method of claim 1, wherein the first character type is a sequence control character and the second character type is a numerical character.

3. The method of claim 2, wherein the sequence control character and the numerical character are received in a same time frame.

4. The method of claim 1, wherein the first character type is a start character and the second character type is a start-of-frame octet.

5. The method of claim 4 wherein the start character and the start-of-frame octet are received in different time frames.

6. The method of claim 1, wherein the third character type is a terminate control character and the fourth character type is an idle character, and the terminate control character and the idle character are received in a same time frame.

7. The method of claim 1, wherein the third character type is a terminate control character and the fourth character type is a frame data octet, and the terminate control character and the frame data octet are received in a same time frame.

8. The method of claim 1, wherein assigning an order to the data receiving lanes comprises:

assigning a lane 0 to the lane in which the first character type is received;

assigning a lane 3 to the lane in which the second character type is received;

assigning a lane 1 to the lane in which the third character type is received; and assigning a lane 2 to the lane in which the fourth character type is received.

9. The method of claim 8, wherein the third character type is a terminate control character and the fourth character type is an idle character.

10. The method of claim 8, wherein the third character type is a frame data octet and the fourth character type is a terminate control character.

11. The method of claim 1, wherein the receiver is a XAUI receiver.

12. A method of reordering data within a data packet received on a receiver, comprising:

receiving data from a data packet on four data receiving lanes of the receiver;

determining in which of the four lanes a first character type at the start of the data packet is received and in which of the four lanes a second character type at the start of the data packet is received;

based on at least that determination, assigning a lane 0 to the lane in which the first character type is received and a lane 3 to the lane in which the second character type is received;

determining in which of the four lanes a third character type at the end of the data packet is received and in which of the four lanes a fourth character type at the end of the data packet is received; and based on at least that determination, assigning a lane 1 to the lane in which the third character type is received and a lane 2 to the lane in which the fourth character type is received, wherein by such assigning the received data is presented in order in lane 0 through lane 3.

13. A multi-lane receiver for receiving data packets, comprising:

a first set of at least four data receiving lanes operable to simultaneously receive data in the data packet (e.g., lanes A-D);

a lane monitor coupled to each lane of the first set and operable to determine in which of the lanes:

a first character type in the data packet is received;

a second character type in the data packet is received;

a third character type in the data packet is received; and a fourth character type in the data packet is received;

a lane reorderer responsive to the lane monitor and coupled to receive data from the first set of lanes; and a second set of at least four data receiving lanes (e.g., lanes 0-3) coupled to receive data from the first set of lanes through the lane reorderer, wherein based at least on a determination by the lane monitor the lane reorderer is operable to assign the lanes of the first set to the lanes of the second set to present the received data in a desired order.

14. The multi-lane receiver of claim 13, wherein each of the lanes of the sets is at least eight bits wide.

15. The multi-lane receiver of claim 13, wherein the receiver is a XAUI receiver.

16. The multi-lane receiver of claim 13, wherein the first character type is a sequence control character and the second character type is a numerical character.

17. The multi-lane receiver of claim 13, wherein the first character type is a start character and the second character type is a start-of-frame octet.

18. The multi-lane receiver of claim 13, including a deserializer coupled to each lane of the first set and operable to convert received data from serial form to parallel form prior to being received by the lane.

19. The multi-lane receiver of claim 13, wherein the lane reorderer comprises a set of multiplexers coupled between the first and second sets of lanes for coupling a lane from the first set to a lane from the second set, the multiplexers responsive to the lane monitor.

20. A multi-lane receiver for receiving data packets, comprising:

a first set of at least four data receiving lanes operable to simultaneously receive data in the data packet (e.g., lanes A-D);

means for determining in which of the lanes of the first set a first character type in the data packet is received, a second character type in the data packet is received, a third character type in the data packet is received, and a fourth character type in the data packet is received;

a second set of at least four data receiving lanes (e.g., lanes 0-3) coupled to receive data from the first set of lanes; and means responsive to the determining means for assigning the lanes of the first set to the lanes of the second set to present the received data in a desired order.

21. A multi-lane receiver for receiving data packets, comprising:

a first set of four data receiving lanes operable to simultaneously receive data in the data packet (e.g., lanes A-D);

a lane monitor coupled to each lane of the first set and operable to determine in which of the lanes:

a first character type at the start of the data packet is received;

a second character type at the start of the data packet is received;

a third character type at the end of the data packet is received; and a fourth character type at the end of the data packet is received;

a lane reorderer responsive to the lane monitor and coupled to receive data from the first set of lanes; and, a second set of four data receiving lanes (e.g., lanes 0-3) coupled to receive data from the first set of lanes through the lane reorderer, wherein based at least on a determination by the lane monitor the lane reorderer is operable to assign the lanes of the first set to the lanes of the second set to present the received data in a desired order.

22. The multi-lane receiver of claim 21, wherein the receiver is a XAUI receiver.

23. The multi-lane receiver of claim 21, wherein the first character type is a sequence control character and the second character type is a numerical character.

24. The multi-lane receiver of claim 21, wherein the first character type is a start character and the second character type is a start-of-frame octet.

25. The multi-lane receiver of claim 21, wherein the third character type is a terminate control character and the fourth character type is an idle character.

26. The multi-lane receiver of claim 21, wherein the third character type is a frame data octet and the fourth character type is a terminate control character.

27. The multi-lane receiver of claim 21, wherein the lane reorderer comprises a set of multiplexers coupled between the first and second sets of lanes for coupling a lane from the first set to a lane from the second set, the multiplexers responsive to the lane monitor.

* * * * *